United States Patent

Nakanura et al.

Patent Number: 5,235,228
Date of Patent: Aug. 10, 1993

[54] MOTOR BALANCING STRUCTURE

[75] Inventors: Kosei Nakanura; Yukio Katsuzawa; Michi Masuya, all of Yamanashi, Japan

[73] Assignee: Fanuc Ltd., Yamanashi, Japan

[21] Appl. No.: 768,207

[22] PCT Filed: Feb. 15, 1991

[86] PCT No.: PCT/JP91/00187
§ 371 Date: Oct. 23, 1991
§ 102(e) Date: Oct. 23, 1991

[87] PCT Pub. No.: WO91/13485
PCT Pub. Date: Sep. 5, 1991

[30] Foreign Application Priority Data
Feb. 27, 1990 [JP] Japan ................ 2-44609

[51] Int. Cl.$^5$ ............ H02K 5/24; H02K 5/10; H02K 19/20; F16F 15/22

[52] U.S. Cl. ................ 310/51; 310/88; 310/168; 74/573 R

[58] Field of Search ........... 310/51, 168, 261, 68 B, 310/88; 324/173; 74/573 R

[56] References Cited

U.S. PATENT DOCUMENTS

| | | | |
|---|---|---|---|
| 2,557,659 | 6/1951 | Ingraham | 74/573 R |
| 2,558,737 | 7/1951 | Darnell | 310/51 |
| 3,512,022 | 5/1970 | Gilbert | 74/573 R |
| 3,662,197 | 5/1972 | Worst | 310/78 |
| 4,082,968 | 4/1978 | Jones | 310/68 B |
| 4,389,586 | 6/1983 | Foster et al. | 310/67 R |
| 4,642,886 | 2/1987 | Muck et al. | 310/51 |

FOREIGN PATENT DOCUMENTS

| | | | |
|---|---|---|---|
| 0161326 | 11/1985 | European Pat. Off. | 74/573 R |
| 53-53503 | 5/1978 | Japan . | |
| 54-63201 | 5/1979 | Japan . | |
| 55-43360 | 3/1980 | Japan . | |
| 0062050 | 5/1981 | Japan | 74/573 R |
| 0138417 | 7/1985 | Japan | 74/573 R |

Primary Examiner—Steven L. Stephan
Assistant Examiner—C. LaBalle
Attorney, Agent, or Firm—Nikaido, Marmelstein, Murray & Oram

[57] ABSTRACT

Labyrinth disks, which are integral components of an electric motor, provided in the front and rear portions of the motor and/or the rotational speed detecting gear, which also is an integral component of the motor, of a rotational speed detector for detecting the rotational speed of the output shaft of the motor are employed for balancing the motor.

The labyrinth disks and the rotational speed detecting gear are provided at the outer surfaces thereof with a plurality of internally threaded holes. An imbalance in the motor is measured after completely assembling the motor, and then a balancing screw is screwed into the internally threaded hole to an appropriate point, to thereby balance the rotary unit of the motor.

11 Claims, 4 Drawing Sheets

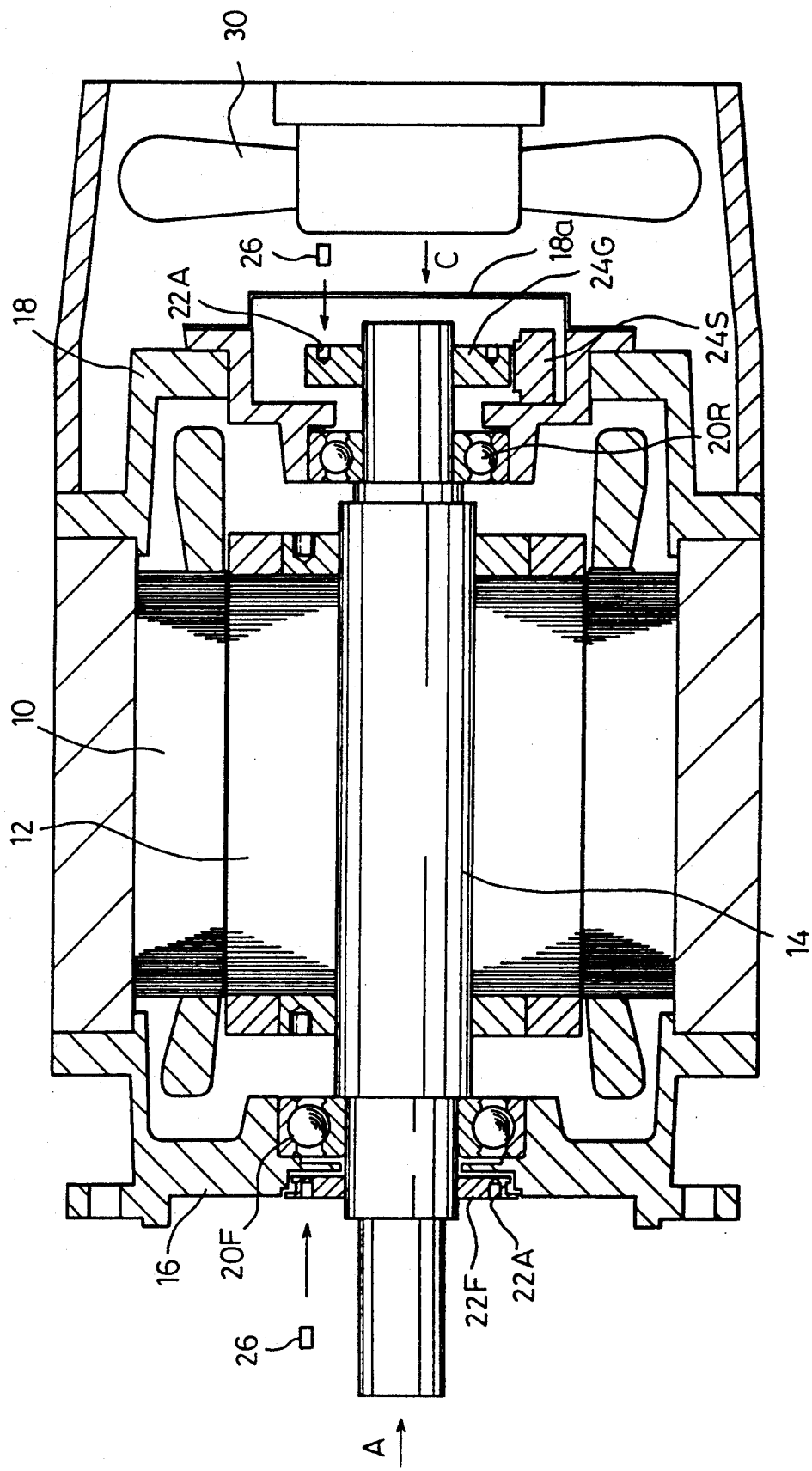

5,235,228

MOTOR BALANCING STRUCTURE

TECHNICAL FIELD

The present invention relates to the construction of a general-purpose industrial electric motor, by which is the vibration and noise are reduced, and more particularly, to a motor balancing structure for balancing such an electric motor.

BACKGROUND ART

The increases in the machining speed in the field of machine tools have led to problems such as a lowering of the machining accuracy due to the vibration of the electric drive motors used for driving the spindle and other movable components of a machine tool, and an increase of the noise therefrom. It is considered that the vibration of an electric motor can be most effectively reduced by correcting an unbalanced state of each rotating component of the electric motor.

Therefore, in the conventional procedure for assembling an electric motor, the respective rotating components of the motor are first balanced to thereby obtain a well-balanced final product as the electric motor.

In a very-high speed motor operating at a maximum rotational speed of more than 15,000 r.p.m., however, even a very small imbalance therein can cause detrimental vibration and noise when the motor operates in the high-speed range. Namely, if the rotating components of an electric motor are balanced individually and the components are then assembled, very small imbalances remaining in the components may accumulate to form an imbalance that exceeds an allowable limit.

Even if it is intended to complete the construction of the motor by pre-assembling the rotating components thereof and balancing same before combining the balanced rotating components with a motor casing and associated parts, it is frequently impossible to carry out such an assembling process due to structural restrictions, and even if it is possible to assemble the motor by such assembling method, a problem arises in the quality control of the motor. For example, it is necessary to take the bearings to pieces, to attach only the inner rings to the output shaft of the motor, and to reassemble the bearings after balancing the combination of the output shaft and the inner rings. Such a method requires much time and labor, and unavoidably gives rise to problems such that the bearings are contaminated with dust. Furthermore, the parts and components of the motor must be mounted on an external drive means of a commercial balancing machine, to be dynamically balanced individually, but since the external drive means of the commercial balancing machine can rotate the parts only at 3,000 r.p.m. at most, the commercial balancing machine is incapable of detecting a small imbalance thereof.

DISCLOSURE OF THE INVENTION

Accordingly, an object of the present invention is to provide a low cost, balanced motor structure capable of balancing a motor so that the motor is able to operate in a well-balanced state over the entire operating speed range.

In view of the above object, the present invention provides a balanced motor structure comprising a means fixedly mounted on an end of an output shaft of a motor for defining an externally exposed surface formed therein with a plurality of internally threaded holes.

An electric motor is usually provided with a structural member for forming a labyrinth seal, and a rotational speed detector on one end of the output shaft thereof. Therefore, when a plurality of internally threaded holes are formed in the outer surface of the structural member defining the labyrinth seal, to permit balancing screws, i.e., small balancing parts, to be threadedly engaged therein, the motor can be easily balanced by screwing the balancing screw in the internally threaded hole, to an appropriate point, to thereby eliminate the imbalance. If a fine balance cannot be achieved by using the internally threaded holes, a portion of the component part at an appropriate position between the adjacent internally threaded holes may be drilled to an appropriate depth at which an accurate balance is obtained. When the rotational speed detector has a gear member having the shape of a toothed disk, the outer face of the gear member can be adopted for the same purpose. Namely, the present invention is intended to enable a dynamic balance of an electric motor to be obtained through a measurement of an imbalance while the assembled motor is rotated under its own drive power on a commercial balancing machine marketed as a field balancing machine. The imbalance can be eliminated by screwing the balancing screw, from outside the motor, in to the internally threaded hole of the labyrinth seal-defining structural member and/or the rotational speed detecting gear, to an appropriate point. Since the motor can be balanced at both the front and rear ends, to obtain a two-point balance, the motor can be accurately dynamically balanced.

BRIEF DESCRIPTION OF THE DRAWINGS

FIG. 3 is a longitudinal sectional view of an electric motor incorporating therein a dynamic balancing structure according to a second embodiment of the present invention;

BEST MODE OF CARRYING OUT THE INVENTION

The present invention will be described hereinafter with reference to preferred embodiments thereof as illustrated in the accompanying drawings.

Figure 1:
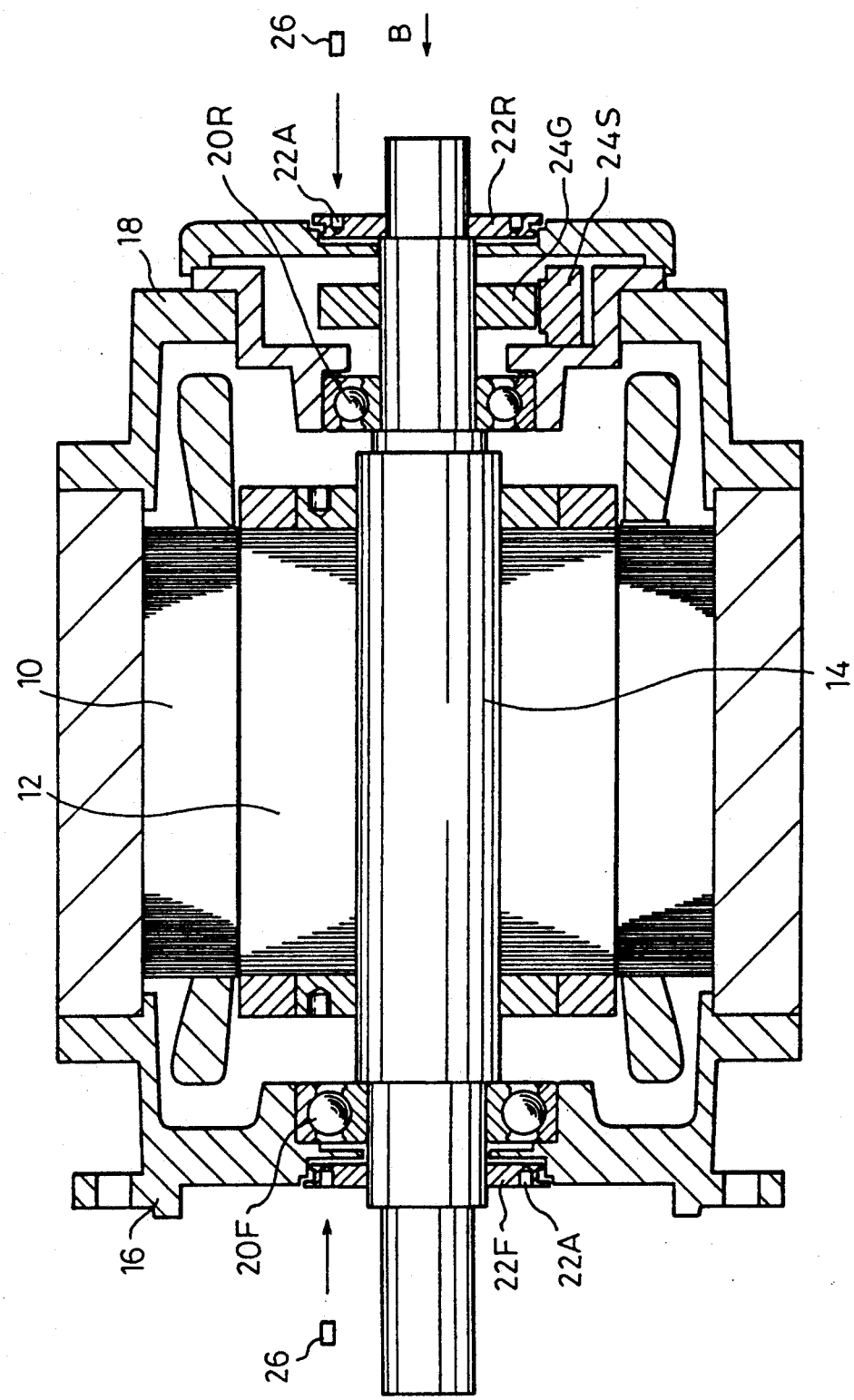
FIG. 1 is a longitudinal sectional view of an electric motor incorporating therein a dynamic balancing structure according to a first embodiment the present invention.

Referring to FIG. 1, a front bearing 20F and a rear bearing 20R are fitted in a front housing 16 and a rear housing 18 provided on the front and rear ends of a stator 10, respectively. A rotor 12 integrally combined with an output shaft 14 supported for rotation by the bearings 20F and 20R is disposed radially opposite to the stator 10. The components 24G and 24S of a rotation detector for detecting the rotational position and/or the rotational speed of the output shaft 14 are provided in connection with the rear portion of the output shaft 14. In this embodiment, the front and rear ends of the output shaft 14 extend outside the front housing 16 and the rear housing 18, respectively.

If the electric motor provided with the output shaft 14 having front and rear ends respectively projecting outward from the front and rear housings is intended for use on a machine tool or the like, generally the motor is provided with labyrinth seals at the front and rear ends thereof, i.e., in the front end of the front housing 16 and in the rear end of the rear housing 18, respectively, to prevent the entry of oil mist and the like contained in the ambient atmosphere to the inside of the motor through gaps between the output shaft and the front housing 16, and between the output shaft and the rear housing 18. Accordingly, disk-like members 22F and 22R forming the labyrinth seals in combination with the front housing 16 and the rear housing 18 are fixed to the front and rear ends of the output shaft 14, respectively.

The balanced motor structure of the first embodiment of the present invention is characterized by balancing the motor by using the front disk-like member 22F and the rear disk-like member 22R, after the completion of the assembly of the motor.

Figure 2:
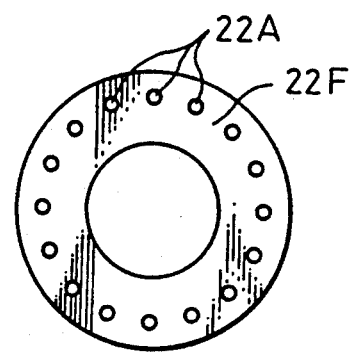
FIG. 2 is a front view of a structural member forming a labyrinth seal, as viewed in the direction of an arrow A or B in FIG. 1.

Referring to FIGS. 1 and 2, the disk-like member 22F (22R) is provided, in an outer surface thereof exposed to the outside, with a plurality of internally threaded holes (in this embodiment, sixteen internally threaded holes) 22A at the same radial positions and at equal angular intervals. The motor shown in FIG. 1 is rotated under its own drive power on a commercial field dynamic balancer, so that the rotational speed of the output shaft 14 is gradually increased to a maximum rotational speed of, for example, 15,000 r.p.m., to measure an imbalance thereof. Then, a balancing screw 26 capable of being engaged in the internally threaded hole 22A is screwed in the internally threaded hole 22A to an appropriate point at which the measured imbalance is dynamically adjusted to the least possible extent. At this stage, since the internally threaded holes 22a in both the front and rear disks 22F and 22R can be used for the balancing of the motor, the accuracy of the adjustment of the balance of the motor can be increased.

The selective use of a plurality of kinds of balancing screws 26 having different lengths further improves the balancing accuracy. For an even more accurate balancing portions of the disk-like members 22F and 22R may be drilled to desired depths to thereby remove any residual imbalance of the motor.

The construction of the rear portion of an electric motor shown in FIG. 3 incorporating a balancing structure according to the second embodiment of the present invention is different from that of the rear portion of the motor shown in FIG. 1. Namely, the rear end of an output shaft 14 terminates at the components 24G and 24S of a rotational speed detector, and a cooling fan 30 is disposed behind the output shaft 14.

When the motor of this embodiment is to be dynamically balanced by the field balancing machine, the cooling fan 30 and the rear cover 18a of a rear housing 18 are temporarily removed. A front disk-like member 22F provided at the front end of the motor, and the gear member 24G of the rotational speed detector on the rear end are formed with internally threaded holes 22A at equal angular intervals, as shown in FIG. 2, and balancing screws 26 are screwed in the internally threaded holes 22A, to appropriate points, to thereby eliminate an imbalance measured by the balancing machine.

Figure 4:
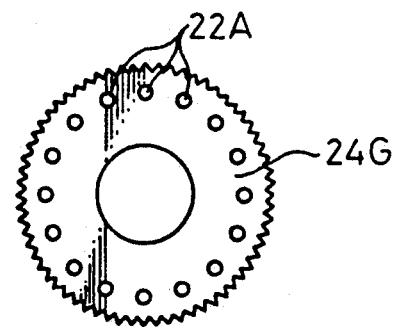
FIG. 4 is a front view of a gear member used for detecting a rotational speed of the motor, as viewed in the direction of the arrow C in FIG. 3.

FIG. 4 illustrates the gear member 24G viewed in the direction of the arrow C.

Figure 5:
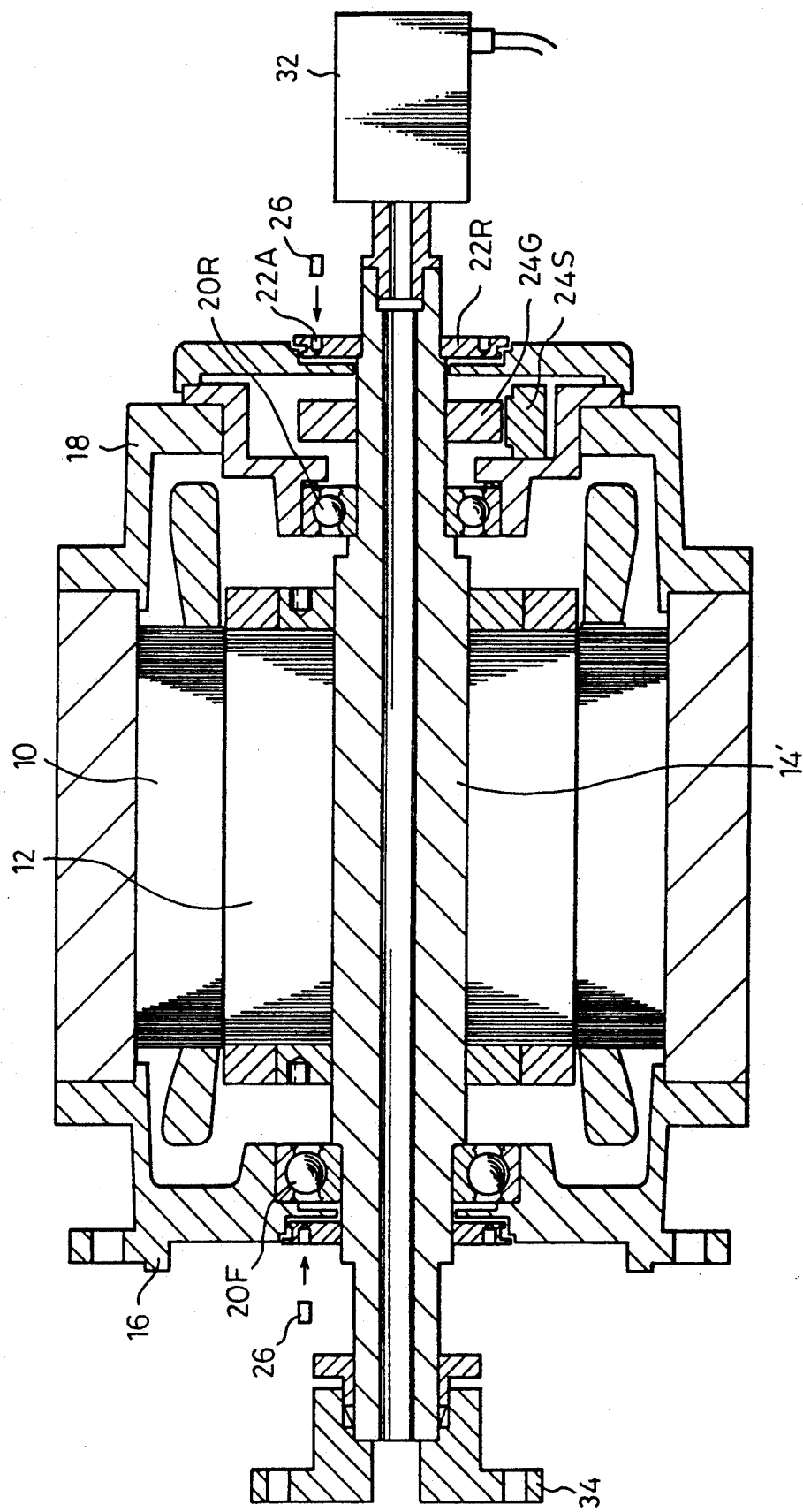
FIG. 5 is a longitudinal sectional view of another electric motor incorporating therein a dynamic balancing structure similar to that shown in FIG. 1.

FIG. 5 illustrates an electric motor provided with a hollow output shaft 14', instead of the output shaft 14 of the motor of FIG. 1. The hollow output shaft 14' has a front end provided with a coupling member 34, and a rear end connected to a rotary joint 32.

The present invention is also applicable to the balancing of the motor to be used in a mode such as illustrated in FIG. 5.

As apparent from the foregoing description, according to the present invention, the imbalance of an electric motor can be all but eliminated after completely assembling the motor, simply by using balancing screws. Since the disk-like members for the labyrinth seals and the gear member of the rotational speed detector for receiving the balancing screws are integral components of the electric motor, the use of the disk-like members for the labyrinth seals or the gear as the means of obtaining a dynamic balancing of the motor does not appreciably increase the manufacturing cost of the motor. Furthermore, since the motor is balanced after the completion of the assembly of the motor, the resultant balance of the motor is very accurate.

We claim:

1. A balanced motor structure of an electric motor having a rotating output shaft provided with axially opposite external ends, comprising:
   two disk members fixedly attached to the opposite ends of the output shaft, each of said disk members having axially inner and outer surfaces formed perpendicular to an axis of rotation of the output shaft, the axially outer surface of each of said disk members having defined thereon a plurality of internally threaded holes for axially receiving balancing screws, the plurality of internally threaded holes being externally exposed so as to enable an operator to access said plurality of internally threaded holes, wherein
   at least one of said disk members is provided with a labyrinth defined in the axially inner surface and includes means for sealing the output shaft in cooperation with an outermost portion of an axial housing member around the output shaft of said motor.

2. A balanced motor structure according to claim 1, wherein at least one of said disk members includes a rotational speed detecting gear means having gear teeth formed on an outer circumference of said one disk member, for detecting a rotational speed of said output shaft.

3. A balanced motor structure according to claim 1, wherein the internally threaded holes formed in the outer surface of each of said disk members are arranged at equal radial distances from the axis of rotation of the output shaft, and at equal angular intervals.

4. A balanced motor structure according to claim 1, wherein the internally threaded holes formed in the outer surface of said at least one disk member having the labyrinth defined thereon are arranged at equal radial distances from the axis of rotation of the output shaft, and at equal angular intervals.

5. A balanced motor structure according to claim 2, wherein the internally threaded holes formed in the outer surface of said at least one disk member having the rotational speed detecting gear are arranged at equal radial distances from the axis of rotation of the output shaft, and at equal angular intervals.

6. A balanced motor structure according to claim 1, further comprising:

single balancing screw selected from among screws having different lengths from each other, said at least one screw being screwed in a corresponding internally threaded hole to an appropriate point on at least one of said two disk members.

7. A balanced motor structure of an electric motor having a rotating output shaft provided with axially opposite external ends, comprising:

two disk members fixedly attached to the opposite ends of the output shaft, each of said disk members having axially inner and outer surfaces formed perpendicular to an axis of rotation of the output shaft, the axially outer surface of each of said disk members having defined thereon a plurality of internally threaded holes for axially receiving balancing screws, the plurality of internally threaded holes being externally exposed so as to enable an operator to access said plurality of internally threaded holes, at least one of said disk members being provided with a labyrinth defined in the axially inner surface and includes means for sealing the output shaft in cooperation with an outermost portion of an axial housing member around the output shaft of said motor; and balancing screw means threadably and interchangeably fitted in a corresponding internally threaded hole in at least one of said two disk members, for interchangeably balancing the output shaft of the electric motor, wherein said balancing screw means includes one of a plurality of screws of different lengths relative to each other.

8. A balanced motor structure according to claim 7, wherein at least one of said disk members includes a rotational speed detecting gear means having gear teeth formed on an outer circumference of said one disk member, for detecting a rotational speed of said output shaft.

9. A balanced motor structure according to claim 7, wherein the internally threaded holes formed in the outer surface of each of said disk members are arranged at equal radial distances from the axis of rotation of the output shaft, and at equal angular intervals.

10. A balanced motor structure according to claim 7, wherein the internally threaded holes formed in the outer surface of said at lest one disk member having the labyrinth defined thereon are arranged at equal radial distances from the axis of rotation of the output shaft, and at equal angular intervals.

11. A balanced motor structure according to claim 8, wherein the internally threaded holes formed in the outer surface of said at least one disk member having the rotational speed detecting gear are arranged at equal radial distances from the axis of rotation of the output shaft, and at equal angular intervals.

* * * * *